United States Patent [19]

Miller

[11] Patent Number: 4,982,525

[45] Date of Patent: Jan. 8, 1991

[54] COLLAPSIBLE LOBSTER OR CRAB TRAP

[76] Inventor: James S. Miller, 13357 Portofino Dr., Del Mar, Calif. 92014

[21] Appl. No.: 548,603

[22] Filed: Jul. 5, 1990

[51] Int. Cl.$^5$ .............................................. A01K 69/10
[52] U.S. Cl. .......................................... 43/105; 43/103
[58] Field of Search ................. 43/100, 102, 103, 104, 43/105

[56] References Cited

U.S. PATENT DOCUMENTS

| | | | |
|---|---|---|---|
| 721,913 | 3/1903 | Palmer | 43/100 |
| 1,728,645 | 9/1929 | Ward et al. | 43/100 |
| 1,785,348 | 12/1930 | Holoubek | 43/102 |
| 3,245,173 | 4/1966 | Sylvester | 43/102 |
| 3,795,073 | 3/1974 | Olsen | 43/105 |
| 3,834,064 | 9/1974 | Lane | 43/100 |
| 4,258,496 | 3/1981 | Leone | 43/102 |

*Primary Examiner*—Richard K. Seidel
*Assistant Examiner*—Timothy M. Boynton
*Attorney, Agent, or Firm*—Andsel Group; David L. Baker

[57] ABSTRACT

A collapsible lobster or crab trap is described that has a pyramidal shape with a triangular base and three triangular sides. The sides and the base are covered with a mesh material. At least one of the sides has an entrance leading to a truncated cone shaped net that acts as a passageway to further entrap the catch. The trap has a lifting means in at least one of the sides to assist the diver to remove the catch and rebait the trap by hinging one side of the trap open. There is a net support means to keep the net in an open configuration to provide an easy entry for the catch to enter the trap. The sides are hinged to the base and one of the sides has spring clips near its apex. The hinges and the spring clips allow the trap to be easily placed and secured in its operable pyramidal shape and in its stored collapsed state.

3 Claims, 1 Drawing Sheet

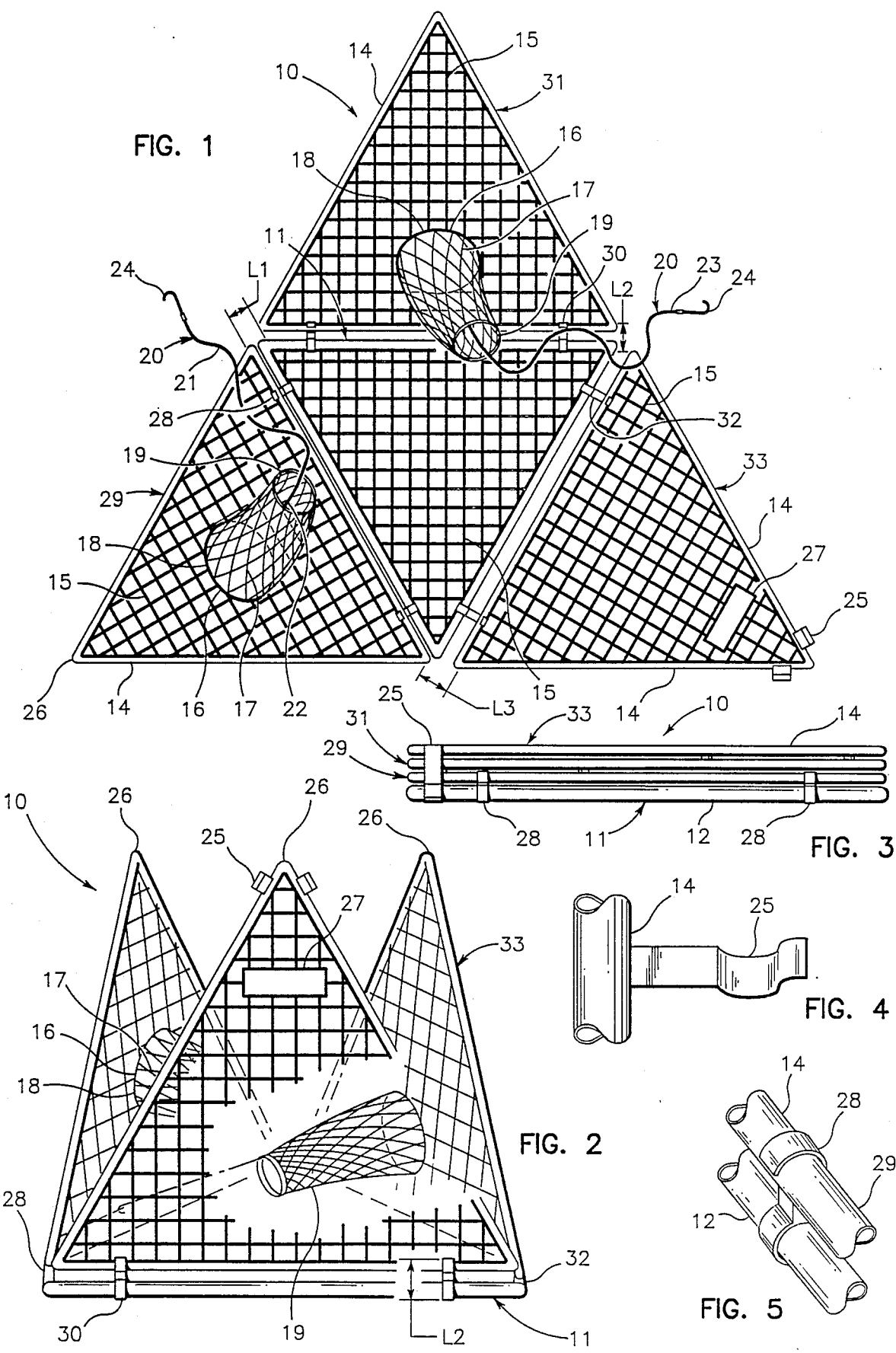

COLLAPSIBLE LOBSTER OR CRAB TRAP

BACKGROUND OF THE INVENTION

1. Field of the Invention

The invention relates to an underwater, pyramidal, lobster or crab trap that is collapsible, light in weight and easily assembled into its operative shape to catch lobsters or crabs. The trap has a triangular base panel and three triangular side panels hingedly attached to their respective sides of the base panel. The side panels meet at their apexes to form the trap. There are truncated cone shaped net sleeves that serve as entrances to further entrap the catch.

2. Description of the Related Art

The older, more traditional traps were made of wood and became heavy and hard to handle after being in the water over a period of time. Rocks were often thrown into the box to act as ballast. Bait was placed in the box to encourage the catch the enter the box. Divers were often required to dive to the traps to retrieve the catch and rebait the box. The catch was often difficult to remove from the box and many times caused the diver emotional trauma or physical injury. The traps were not collapsible and were not easily stored on the deck or in the bow of a boat.

The size of the trap did not allow a commercial trapper to carry many traps aboard the boat. Since the number of traps placed is often directly proportional to the quantity of the catch, increasing the number of traps carried and set is a much sought after goal. The wooden traps were also subject to extensive damage by sudden storms and tidal shifts and often were covered by underwater vermin such as barnacles.

Collapsible traps were introduced but often had complicated mechanisms to keep the sections together and to provide a lobster or crab ingress to the trap and to provide access to the catch by the trapper. The complicated mechanisms were often made inoperable by corrosion or damage.

One of the most troublesome problems encountered in some areas is that the rectangular configuration of the older design traps made it difficult to extract them from those areas containing kelp or seaweed. Those old, heavy and cumbersome traps often get tangled in these aquatic plants and getting those traps to and from the surface is very difficult.

U.S. Pat. No. 1,728,645 to F. P. Ward, et al. on Sept. 17, 1929 shows a rectangular base and sides, with a roof. It is a metal mesh lobster trap having a plurality of swinging metal doors to allow undersize lobsters to escape. The trap has a hinged entrance door and a plurality of securing mechanisms to hold the device together.

U.S. Pat. No. 1,785,348 to J. Holobek on Dec. 16, 1930 describes a wire mesh cage having a rectangular base and sides and two triangular ends. The sides are spring-loaded to be biased away from the base to which they hinge. The ends are rigidly held in an upright position and have a crossbar to which the tops of the side are secured. A latch mechanism holds the two sides together to form the assembled trap.

U.S. Pat. No. 3,245,173 to S. F. Sylvester on Apr. 12, 1966 shows a one-piece plastic lobster pot having a plurality of holes therein. The pot has a rectangular base and an arcuate roof. The trap is formed and held in shape by a plurality of hooks and a long pin inserted through a plurality of knuckles. A preformed converging entrance is provided. The arcuate roof is two-part and is bent open at the parting place to provide access to the catch.

U.S. Pat. No. 3,834,064 to R. T. Lane on Sept. 10, 1974 describes a collapsible shell fish trap with a rectangular base and sides having resilient finger latch or trigger which provides a disengaging means to quickly collapse the sides of the trap. One of the sides has a inwardly hinged trap door with a float attached to provide an entrance to the trap.

U.S. Pat. No. 4,258,496 to A. J. Leone on Mar. 31, 1981 shows a one-piece, molded, plastic, lobster trap with a converging guide path having a trap door. The trap door leads to two converging nets to further entrap the lobster. There are a plurality of access doors with slide keepers to maintain them in a closed position. The base is rectangular and there are rectangular side and an arcuate roof. The base, sides and the roof have a plurality of holes therein.

SUMMARY OF THE INVENTION

The present invention is an underwater trap to catch lobster and crab that permits the user to easily remove the catch from the trap. The trap has four triangular shaped sections, which when assembled into its operative shape, form a pyramid. Each of the sides and the base are constructed differently from the others. The trap sits neatly on the ocean floor and does not have the tendency to tip as many of the others do. The trap may be constructed of light weight, high-strength materials such as urethane plastic or nylon. Other materials may be utilized that also provide light weight, strength and corrosion resistance.

The configuration of most of the previously used traps makes it difficult to extract them from waters where there is kelp or seaweed. The trap of the present invention solves this problem. With a retrieval line attached to the apex of the trap, the pyramidal shape of the present invention presents a pointed tip as it is pulled upward through kelp or seaweed. The angular, sloping sides offer less chance of snagging making extraction of the trap much easier.

The base section forms the bottom of the trap and has thicker, more sturdy components from which to hinge and support the sides. When the trap is in its pyramidal configuration, a loop of a retrieval line may be attached to two of the sides near their apexes. The retrieval line is used to lower and raise the trap to the desired position on the ocean floor.

Two of the sides have an aperture through which the lobster may enter the trap. Immediately inside of the trap and attached to the perimeter of the entrance apertures is a truncated cone shaped net. As the lobster enters the aperture and enters the net, the net funnels the lobster toward the narrower end of the net. The lobster's main interest at that point is trying to reach the bait placed in the interior of the trap. Once in the trap and out of the net, the lobster is unable to enter the narrow end of the net and negotiate the net passage to the outside of the trap. This due to his desire not to damage his antennas. The net is held in an extended position by a taut line attached to another side by means of a hook. The line allows the net to maintain its shape in order to allow easy ingress of the lobster. Without the line, the net would have a tendency to droop toward the bottom of the trap and make it difficult for the lobster to enter the trap. The third side has an aperture that is used for a hand hold grip which identifies that side to the diver or other person that this is the side used to gain access to the interior of the trap to remove the catch and rebait the trap.

One of the sides of the trap has spring clips or similar catches affixed thereto to maintain the sides in a closed pyramidal structure. The clips of the one side catch on the perimeter bars of the other two sides. When the trap is folded into its storage configuration, the clips provide means of securing and retaining the sides and base in a flat stack. Handling of the traps is thereby facilitated when loading and unloading the traps to and from the deck, bow or hold of a fishing boat. The triangular storage configuration enables storage in the bow of a boat where most smaller boat owners store their traps. This allows more traps to be carried on the boat which increases the chance for greater income. Traps of other shapes do not enhance storage as the present trap does.

A collapsible trap is described herein that has a base frame member with a three-sided, rod-like frame and three side frame members also having a three-sided, rod-like frame. Each one of the three side frame members is hingedly attached to a respective side of the base frame member so that all three sides of the base frame member hingedly support a side frame member. One of the hinges are shown in FIG. 5. However other configurations could be used. A mesh material connects the sides of the base frame member and connects the side frame members individually and covers the inner area enclosed by the sides of each of the base frame and side frame members. There is at least one entrance port in the mesh of at least one of the side frame members. An interior net has a truncated cone shape and is attached to the circumference of the entrance port. The interior net has a larger opening at the end attached to the entrance port than at a distal end. The interior net has a means to support the net while inside the trap. There is a securing means to releasingly secure the apexes of the side frame members in a closely engaged position, to maintain the base frame member and side frame members in a pyramidal enclosure, and to maintain the side frame members and the base frame member in a storage configuration. A gripping means is placed in the mesh of one of the side frame members to lift the base frame member and side frame members and to hinge one of the side frame members away from the other side frame members, while in the pyramidal configuration. The gripping means also provides a means to gain access to the pyramidal enclosure formed by the base frame member and the side frame members by making it easier to hinge one of the side frame members away from the other side frame members.

There are a plurality of first hinges attached to a first side frame member that have a length L1 to allow the first side frame member to hingedly lie upon the base frame member. A plurality of second hinges are attached to a second side frame member that have a length L2, where L2 is longer than L1 to allow the second side frame member to hingedly lie on top of the first side frame member and the base frame member. There are a plurality of third hinges attached to third side frame member that have a length L3, where L3 is longer than L2 to allow the third side frame member to hingedly lie upon the second side frame member, the first side frame member and the base frame member.

It is therefore an object of this invention to provide a collapsible lobster or crab trap that is compact and convenient to store in its collapsed state and simple to assemble into an operable pyramidal shape.

It is another object of this invention to provide a trap that will retain the catch in an unharmed condition.

It is yet another object of this invention to provide a trap that will pass through kelp and seaweed without becoming entangled.

It is another object of this invention to provide a trap that allows a diver to remove the catch and rebait the trap easily without disturbing the location of the trap.

It is yet another object of this invention to provide a trap that has a weighted bottom that assures the proper orientation of the trap when it is lowered from a boat.

It is another object of this invention to provide a trap having hinges of three different lengths to permit the base and the sides to stack flatly when transferred and stored.

BRIEF DESCRIPTION OF THE DRAWINGS

FIG. 1 is an elevational view of the collapsible lobster or crab trap showing all the sides hinged out from the base and lying parallel to the base. The truncated cone entrance net is shown expanded to display its shape. Also shown are the three differing lengths of hinges.

FIG. 2 is a front view of the trap showing the sides in a partially closed position and approaching the closed pyramidal shape.

FIG. 3 is a front view of the trap in the folded, storage configuration.

FIG. 4 is an enlarged partial view showing one of the spring tension clips used to maintain the trap in a closed operating position and in the storage position.

FIG. 5 is an enlarged partial view of one of the hinge means used to pivot the sides on the base.

DESCRIPTION OF THE PREFERRED EMBODIMENT

Referring to FIGS. 1 through 5, a collapsible lobster and crab trap 10 is shown. A collapsible trap 10 has a base frame member 11 that has a three-sided, rod-like frame 12. The three side frame members 29, 31 and 33 have a three-sided, rod-like frame 14. Each one of the sides of the three-sided rod-like frame 14 of the side frame members is hingedly attached to a respective side of the three-sided rod-like frame 12 of the base frame member 11 so that all three sides of the base frame member 11 hingedly support a side frame member. The hinge 28 is shown in FIG. 5.

There is a mesh material 15 connecting the sides 12 of the base frame member 11 and connecting the sides 14 of the side frame members individually and covering the inner area enclosed by the sides of each of the base frame and side frame members. There is at least one entrance port 16 in the mesh 15 of at least one of the side frame members.

An interior net 17 has a truncated cone shape and is attached to the circumference of the entrance port 16. The interior net 17 has a larger opening at the end 18 attached to the entrance port 16 than at a smaller distal end 19. The interior net 17 has a means to support the net 20 while the net 17 is inside the enclosure of the trap 10. The support means 20 can be a length of cord or wire 21 with one end 22 attached to the net. The distal end 23 of the line 21 has a hook 24 or other similar means attached that hooks into a portion of the mesh 15 of one of the other side frame members.

There is a securing means 25 to releasingly secure the apexes 26 of the side frame members in a closely engaged position in order to maintain a pyramidal enclosure (shown partially formed in FIG. 2). The securing means 25 also maintains the side frame members and the base frame member 11 in a storage configuration as shown in FIG. 3. The securing means 25, shown in FIGS. 1, 2, 3 and 4, is a spring clip or other similar device that releasingly secures side frame member 33 to the other two side frame members 29 and 31.

There is a gripping means 27 in the mesh 15 of side frame members 33 to lift the base and side frame members. The gripping means 27 is also used to hinge side frame members 33 away from the other side frame members, while in the pyramidal configuration, to gain access to the pyramidal enclosure formed by the base frame member 11 and the side frame members.

There are a plurality of first hinges 28 attached to a first side frame member 29 that have a length L1 to allow the first side frame member 29 to hingedly lie upon the base frame member 11. A plurality of second hinges 30 are attached to a second side frame member 31 that have a length L2, where L2 is longer than L1 to allow the second side frame member 31 to hingedly lie on top of the first side frame member 29 and the base frame member 11. There are a plurality of third hinges 32 attached to third side frame member 33 that have a length L3, where L3 is longer than L2 to allow the third side frame member 33 to hingedly lie upon the second side frame member 31, the first side frame member 29 and the base frame member 11 as shown in FIG. 3. This also allows the apexes 26 of the side frame members to be more easily aligned when placing the trap into its operable pyramidal form.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:
1. A collapsible trap comprising:
   a. a base frame member having a three-sided, rod-like frame;
   b. three side frame members having a three-sided, rod-like frame;
   c. each one of the three side frame members hingedly attached to a respective side of the base frame member so that all three sides of the base frame member hingedly support a side frame member;
   d. a mesh material connecting the sides of the base frame member and connecting the side frame members individually and covering the inner area enclosed by the sides of each of the base frame and side frame members;
   e. at least one entrance port in the mesh of at least one of the side frame members;
   f. an interior net having a truncated cone shape and attached to the circumference of the entrance port and the interior net having a larger opening at the end attached to the entrance port than at a distal end, and the interior net having a means to support the net while inside the trap;
   g. a securing means to releasingly secure apexes of the side frame members in a closely engaged position in order to maintain a pyramidal enclosure and to maintain the side frame members and the base frame member in a storage configuration; and
   h. a gripping means in the mesh of one of the side frame members to lift the base and side frame members and to hinge one of the side frame members away from the other side frame members, while in the pyramidal configuration, to gain access to the pyramidal enclosure formed by the base frame member and the side frame members.

2. A collapsible trap as described in claim 1 further comprising:
   a. a plurality of first hinges attached to a first side frame member having a length L1 to allow the first side frame member to hingedly lie upon the base frame member;
   b. a plurality of second hinges attached to a second side frame member having a length L2, where L2 is longer than L1 to allow the second side frame member to hingedly lie on top of the first side frame member and the base frame member; and
   c. a plurality of third hinges attached to third side frame member having a length L3, where L3 is longer than L2 to allow the third side frame member to hingedly lie upon the second side frame member, the first side frame member and the base frame member.

3. A collapsible trap comprising:
   a. a base frame member having a three-sided, rod-like frame;
   b. three side frame members having a three-sided, rod-like frame;
   c. each one of the three side frame members hingedly attached to a respective side of the base frame member so that all three sides of the base frame member hingedly support a side frame member;
   d. a plurality of first hinges attached to a first side frame member, of the three side frame members, having a length L1 to allow the first side frame member to hingedly lie upon the base frame member;
   e. a plurality of second hinges attached to a second side frame member, of the three side frame members, having a length L2, where L2 is longer than L1 to allow the second side frame member to hingedly lie on top of the first side frame member and the base frame member;
   f. a plurality of third hinges attached to third side frame member, of the three side frame members, having a length L3, where L3 is longer than L2 to allow the third side frame member to hingedly lie upon the second side frame member, the first side frame member and the base frame member;
   g. a mesh material connecting the sides of the base frame member and connecting the side frame members individually and covering the inner area enclosed by the sides of each of the base frame and side frame members;
   h. at least one entrance port in the mesh of at least one of the side frame members;
   i. an interior net having a truncated cone shape and attached to the circumference of the entrance port and the interior net having a larger opening at the end attached to the entrance port than at a distal end, and the interior net having a means to support the net while inside the trap;
   j. a securing means to releasingly secure apexes of the side frame members in a closely engaged position in order to maintain a pyramidal enclosure and to maintain the side frame members and the base frame member in a storage configuration; and
   k. a gripping means in the mesh of one of the side frame members to lift the base and side frame members and to hinge one of the side frame members away from the other side frame members, while in the pyramidal configuration, to gain access to the pyramidal enclosure formed by the base frame member and the side frame members.

* * * * *